(12) United States Patent
Udagawa et al.

(10) Patent No.: US 11,782,447 B2
(45) Date of Patent: Oct. 10, 2023

(54) AUTONOMOUS WORK MACHINE, METHOD OF CONTROLLING THE SAME, AND STORAGE MEDIUM

(71) Applicant: HONDA MOTOR CO., LTD., Tokyo (JP)

(72) Inventors: Takamasa Udagawa, Wako (JP); Hiroto Takahashi, Wako (JP); Makoto Yamamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 17/320,002

(22) Filed: May 13, 2021

(65) Prior Publication Data
US 2021/0263522 A1 Aug. 26, 2021

Related U.S. Application Data

(63) Continuation of application No. PCT/JP2018/042851, filed on Nov. 20, 2018.

(51) Int. Cl.
*G05D 1/02* (2020.01)
*G05D 1/00* (2006.01)
*H04N 23/695* (2023.01)

(52) U.S. Cl.
CPC .......... *G05D 1/0214* (2013.01); *G05D 1/0088* (2013.01); *G05D 1/0246* (2013.01); *G05D 1/0276* (2013.01); *H04N 23/695* (2023.01); *G05D 2201/0208* (2013.01)

(58) Field of Classification Search
CPC .. G05D 1/0214; G05D 1/0088; G05D 1/0246; G05D 1/0276; G05D 2201/0208; G05D 1/0094; H04N 23/695; H04N 23/71; A01B 69/001; A01D 34/008
See application file for complete search history.

(56) References Cited

U.S. PATENT DOCUMENTS

| | | | |
|---|---|---|---|
| 5,911,669 A | 6/1999 | Stentz et al. | |
| 8,958,939 B2 | 2/2015 | Einecke et al. | |
| 10,068,141 B2 | 9/2018 | Shiromizu et al. | |
| 2011/0153172 A1 | 6/2011 | Anderson | |

(Continued)

FOREIGN PATENT DOCUMENTS

| EP | 3226207 A1 | 10/2017 |
|---|---|---|
| JP | H1-160402 A | 6/1989 |

(Continued)

OTHER PUBLICATIONS

Extended European Search Report for European Patent Application No. 18940550.9 dated Oct. 29, 2021.

(Continued)

*Primary Examiner* — Rodney A Butler
(74) *Attorney, Agent, or Firm* — Thomas | Horstemeyer, LLP

(57) ABSTRACT

An autonomous work machine that includes a camera configured to capture an image of an external world, comprises a determination unit configured to determine, based on an image captured by the camera, whether backlighting has occurred, and a control unit configured to control, in a case in which the determination unit has determined that the backlighting has occurred, the autonomous work machine so as to avoid the backlighting.

12 Claims, 11 Drawing Sheets

(56) References Cited

U.S. PATENT DOCUMENTS

| | | | |
|---|---|---|---|
| 2013/0190965 A1 | 7/2013 | Einecke et al. | |
| 2017/0270369 A1 | 9/2017 | Shiromizu et al. | |
| 2018/0046187 A1* | 2/2018 | Martirosyan | B64C 39/024 |

FOREIGN PATENT DOCUMENTS

| | | |
|---|---|---|
| JP | 2007-156689 A | 6/2007 |
| JP | 2009-037541 A | 2/2009 |
| JP | 2010-226652 A | 10/2010 |
| JP | 2011-128212 A | 6/2011 |
| JP | 2011158281 A | 8/2011 |
| JP | 2013-153413 A | 8/2013 |
| JP | 2016-6932 A | 1/2016 |
| JP | 2016-95661 A | 5/2016 |
| JP | 2017-173875 A | 9/2017 |
| JP | 2017207340 A | 11/2017 |
| JP | 2017-221222 A | 12/2017 |
| JP | 2018092237 A | 6/2018 |
| JP | 2018092527 A | 6/2018 |
| WO | 2017/159176 A1 | 9/2017 |
| WO | 2020/105123 A1 | 5/2020 |

OTHER PUBLICATIONS

International Search Report for PCT/JP2018/042851 dated Feb. 26, 2019.

\* cited by examiner

AUTONOMOUS WORK MACHINE, METHOD OF CONTROLLING THE SAME, AND STORAGE MEDIUM

CROSS-REFERENCE TO RELATED APPLICATION(S)

This application is a continuation of International Patent Application No. PCT/JP2018/042851 filed on Nov. 20, 2018, the entire disclosure of which is incorporated herein by reference.

BACKGROUND OF THE INVENTION

Field of the Invention

The present invention relates to an autonomous work machine, a method of controlling the same, and a storage medium.

Description of the Related Art

PTL 1 discloses a lane departure prevention device that recognizes the position of a lane marker by using a camera mounted on a vehicle and executes image processing to correct the position of the lane marker when the detected position of the sun is in a backlighting position with respect to the camera.

CITATION LIST

Patent Literature

PTL 1: Japanese Patent Laid-Open No. 2009-37541

SUMMARY OF THE INVENTION

Technical Problem

However, in an autonomous work machine that observes the external world by using an image captured by a camera and works in a work area while autonomously traveling through various kinds of tracks, if the information of the external world is to be recognized by applying image processing in the manner of PTL 1, a more complicated image processing operation may be needed depending on various kinds of image capturing conditions.

In consideration of the above problem, the present invention provides a technique that, instead of correcting the image of the camera, controls the autonomous work machine to avoid backlighting.

Solution to Problem

According to one aspect of the present invention, there is provided an autonomous work machine that includes a camera configured to capture an image of an external world, characterized by comprising: a determination unit configured to determine, based on an image captured by the camera, whether backlighting has occurred; and a control unit configured to control, in a case in which the determination unit has determined that the backlighting has occurred, the autonomous work machine so as to avoid the backlighting.

Advantageous Effects of Invention

According to the present invention, the autonomous work machine can be controlled to avoid backlighting.

DESCRIPTION OF EMBODIMENTS

First Embodiment

Embodiments of the present invention will be described hereinafter with reference to the accompanying drawings. Components described in the embodiments are merely exemplary and are not limited by the following embodiments.

Figure 1A:
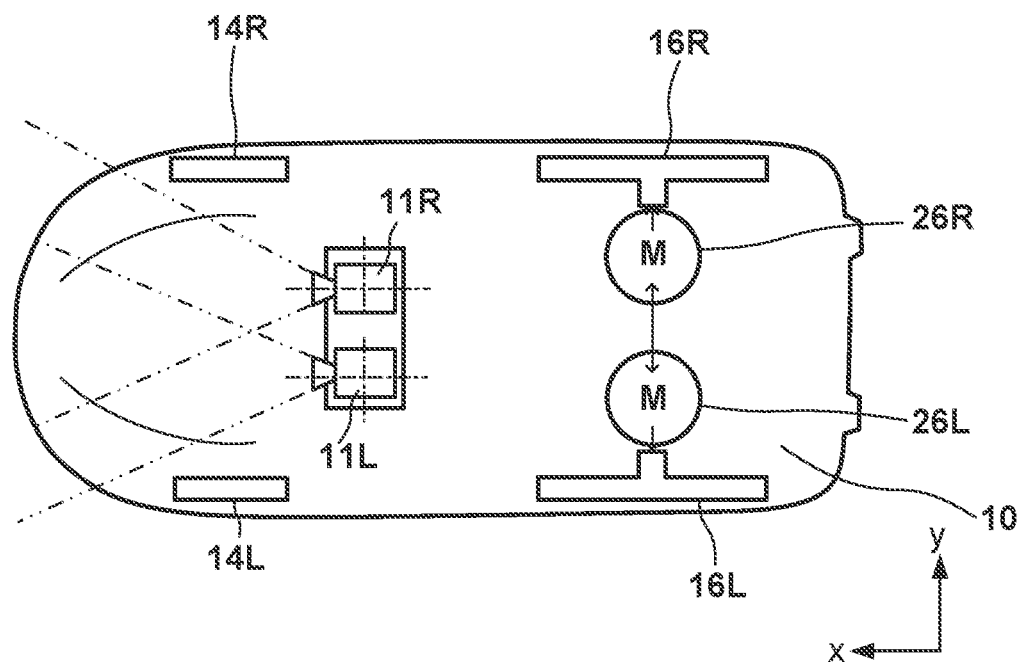
FIG. 1A is a schematic top view of an autonomous work machine according an embodiment.
Figure 1B:
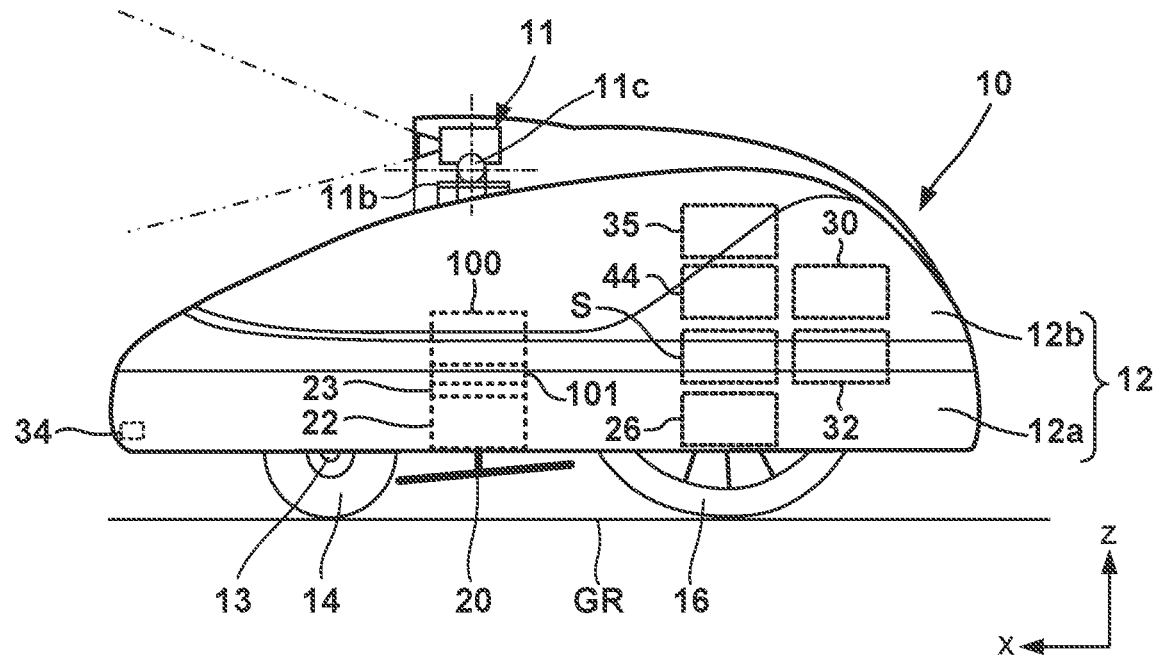
FIG. 1B is a schematic side view of the autonomous work machine according to the embodiment.

(Outline of Autonomous Work Machine)
FIG. 1A is a schematic top view of an autonomous work machine according to the first embodiment, and FIG. 1B is a schematic side view of the autonomous work machine according to the first embodiment. In the following description, the direction of travel (vehicle longitudinal direction: x direction) of the autonomous work machine in a side view, a lateral direction (vehicle width direction: y direction) orthogonal to the direction of travel, and a perpendicular direction (z direction) orthogonal to the direction of travel and the lateral direction are defined as a front-and-rear direction, a left-and-right direction (horizontal direction), and a vertical direction, respectively, and the arrangement of each component will be explained in accordance with these directions.

In FIGS. 1A and 1B, reference numeral 10 denotes an autonomous work machine that works in a work area while autonomously traveling in the work area. The autonomous work machine 10 can function as, for example, a lawn mower, a weeder, snow removal equipment, a golf ball collector, a tiller, or the like that can work in a work area while autonomously traveling in the work area. However, the example of the autonomous work machine is merely an example, and the present invention is applicable to other kinds of work machines. In the following description, the arrangement of a lawn mower whose work area is a plot of lawn will be exemplified to describe the embodiments of the present invention.

As shown in FIGS. 1A and 1B, the autonomous work machine 10 includes cameras 11, a vehicle body 12, a stay 13, front wheels 14, rear wheels 16, a blade 20, a work motor 22, a motor holding member 23, a blade height adjustment motor 100, and a translation mechanism 101. The autonomous work machine 10 also includes travel motors 26, various kinds of sensors S, an electronic control unit (ECU) 44, a charging unit 30, a battery 32, a charging terminal 34, and a notification unit 35.

The cameras 11 for capturing images of the external world of the autonomous work machine 10 are formed by a plurality of cameras (a left camera 11L and a right camera 11R) that can capture the state at the front of the autonomous work machine 10. Distance information between the autonomous work machine 10 and an object, which is present in the front of the autonomous work machine, can be calculated and obtained by using images captured by the cameras 11 (the left camera 11L and the right camera 11R) which have a parallax between the plurality of cameras. In FIGS. 1A and 1B, a set of double dashed chain lines extending in front of each camera 11 (each of the left camera 11L and the right camera 11R) indicates a predetermined angle of view of the camera 11. The ECU 44 can obtain information of the external world of the autonomous work machine 10 from the cameras 11.

Each of the cameras 11 (the left camera 11L and the right camera 11R) is held by a pan angle adjustment mechanism 11b for adjusting an angle in the horizontal direction and a tilt angle adjustment mechanism 11c for adjusting an angle in the vertical direction. The ECU 44 (a control unit C2) can control the angle of each camera 11 by controlling at least one of the pan angle adjustment mechanism 11b and the tilt angle adjustment mechanism 11c.

The vehicle body 12 of the autonomous work machine 10 includes a chassis 12a and a frame 12b attached to the chassis 12a. Two front wheels 14 (a left front wheel 14L and a right front wheel 14R) as left and right small-diameter wheels are fixed to the front part of the chassis 12a via the stay 13. Two rear wheels 16 (a left rear wheel 16L and a right rear wheel 16R) as left and right large-diameter wheels are attached to the rear part of the chassis 12a.

The blade 20 is a rotary blade for lawn mowing attached near the central position of the chassis 12a. The work motor 22 is an electric motor arranged above the blade 20. The blade 20 is connected to and rotated by the work motor 22. The motor holding member 23 holds the work motor 22. The rotation of the motor holding member 23 is regulated with respect to the chassis 12a. In addition, the vertical movement of the motor holding member 23 is permitted by a combination of a guide rail and a slider which can move vertically by being guided by the guide rail.

The blade height adjustment motor 100 is a motor for adjusting the height of the blade 20 in the vertical direction from a ground surface GR. The translation mechanism 101 is connected to the blade height adjustment motor 100, and converts the rotation of the blade height adjustment motor 100 into a vertical translational movement. The translation mechanism 101 is also connected to the motor holding member 23 for holding the work motor 22.

The rotation of the blade height adjustment motor 100 is converted into the translational movement (vertical movement) by the translation mechanism 101, and this translational movement is transmitted to the motor holding member 23. The translational movement (vertical movement) of the motor holding member 23 causes the work motor 22 held by the motor holding member 23 to translationally move (vertically move). The height of the blade 20 from the ground surface GR can be adjusted by the vertical movement of the work motor 22.

The travel motors 26 (a left travel motor 26L and a right travel motor 26R) are two electric motors (motors) attached to the chassis 12a of the autonomous work machine 10. The two electric motors are connected to the left and right rear wheels 16. The left and right rear wheels are independently rotated forward (rotated in an advancing direction) or rotated backward (rotated in a reversing direction) by using the front wheels 14 as driven wheels and the rear wheels 16 as driving wheels. This allows the autonomous work machine 10 to move in various directions.

The charging terminal 34 is a charging terminal installed in the front end position of the frame 12b in the front-and-rear direction, and can receive power from a charging station when connected to a corresponding charging terminal of the charging station. The charging terminal 34 is connected to the charging unit 30 by a wiring line, and the charging unit 30 is connected to the battery 32. The work motor 22, the travel motors 26, and the blade height adjustment motor 100 are also connected to the battery 32, and receive power from the battery 32.

The ECU 44 is an electronic control unit including a microcomputer formed on a circuit board, and controls the operation of the autonomous work machine 10. Details of the ECU 44 will be described later. The notification unit 35 notifies a user of the occurrence of an abnormality in a case in which an abnormality has occurred in the autonomous work machine 10. For example, notification can be performed by sound or display. Alternatively, notification can be performed by outputting an abnormality generation notification to an external device which is wirelessly connected to the autonomous work machine 10. The user can be notified of the occurrence of an abnormality through the external device.

(Control Block Diagram)

Figure 2:
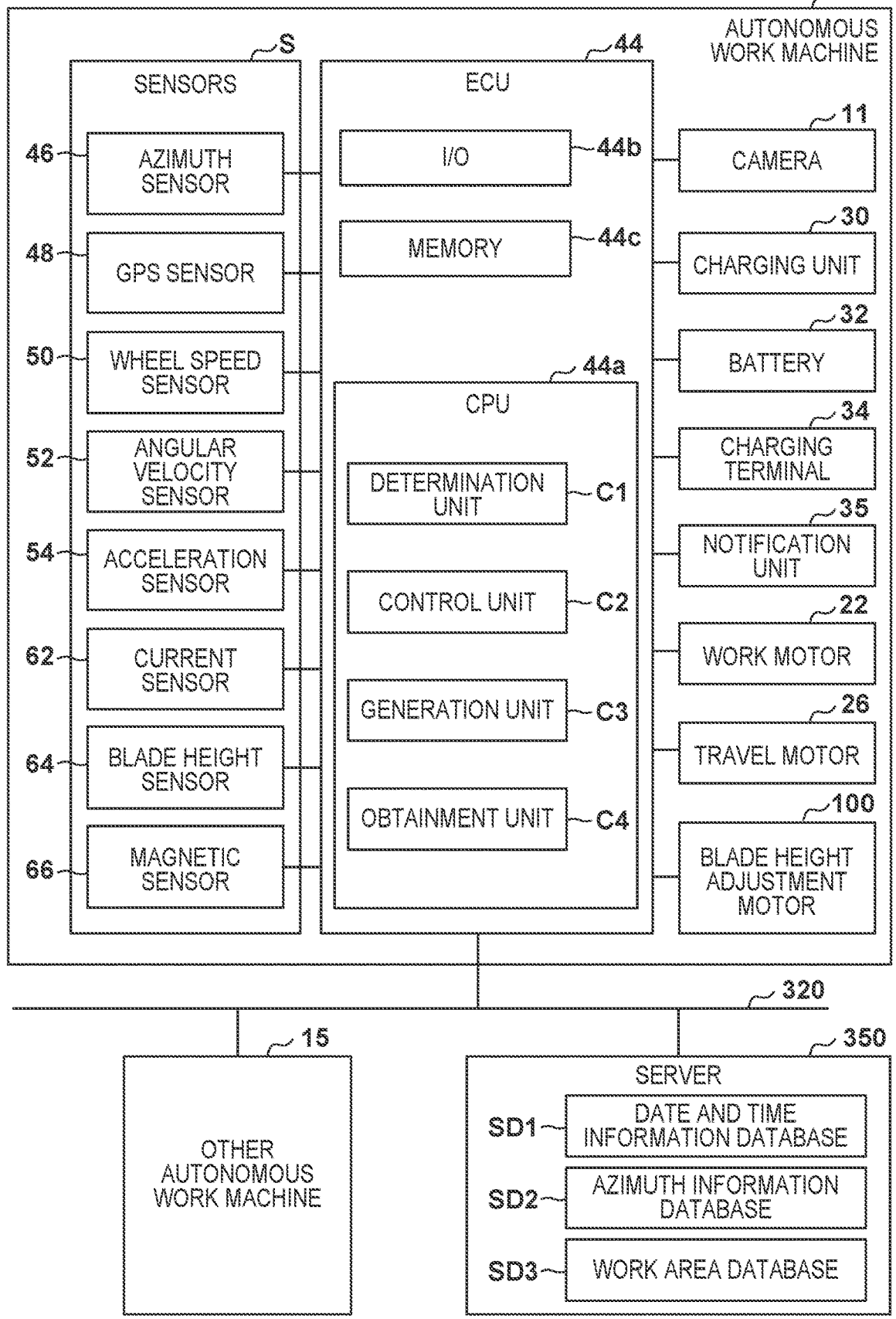
FIG. 2 is a block diagram showing the relationship of inputs/outputs of an electronic control unit (ECU) that controls the autonomous work machine according to the embodiment.

FIG. 2 is a block diagram showing the relationship of inputs/outputs of the electronic control unit (ECU) that controls the autonomous work machine 10. As shown in FIG. 2, the ECU 44 includes a CPU 44a, an I/O 44b, and a memory 44c. The memory 44c functions as a storage unit and is formed by a ROM (Read Only Memory), an EEPROM (Electrically Erasable Programmable Read Only Memory), a RAM (Random Access Memory), or the like.

The memory 44c stores a work schedule of the autonomous work machine 10, information about a work area, various kinds of programs for controlling the operation of the autonomous work machine 10, and an area map that shows the shape of the work area. The autonomous work machine 10 can perform predetermined work in a work area while autonomously traveling in the work area based on the area map of the work area. The ECU 44 can operate as each processing unit for implementing the present invention by reading out and executing a program stored in the memory 44c.

The ECU 44 is connected to the various kinds of sensors S. The sensors S include an azimuth sensor 46, a GPS sensor 48, a wheel speed sensor 50, an angular velocity sensor 52, an acceleration sensor 54, a current sensor 62, a blade height sensor 64, and magnetic sensors 66.

The azimuth sensor 46 and the GPS sensor 48 are sensors for obtaining information of the direction and the position of the autonomous work machine 10. The azimuth sensor 46 detects the azimuth corresponding to the terrestrial magnetism. The GPS sensor 48 receives radio waves from GPS satellites and detects information indicating the current position (the latitude and the longitude) of the autonomous work machine 10.

The wheel speed sensor 50, the angular velocity sensor 52, and the acceleration sensor 54 are sensors for obtaining information on the state of the movement of the autonomous work machine 10. The wheel speed sensor 50 detects the wheel speeds of the left and right rear wheels 16. The angular velocity sensor 52 detects the angular velocity around the vertical axis (the z-axis in the perpendicular direction) in the barycentric position of the autonomous work machine 10. The acceleration sensor 54 detects accelerations in the directions of three perpendicular axes, that is, the x-, y-, and z-axes, which act on the autonomous work machine 10.

The current sensor 62 detects the current consumption (power consumption) of the battery 32. The detection result of the current consumption (power consumption) is saved in the memory 44c of the ECU 44. When a predetermined power amount is consumed and the power amount stored in the battery 32 becomes equal to or lower than a threshold value, the ECU 44 executes control to return the autonomous work machine 10 to a charging station ST (FIG. 4) in order to charge the autonomous work machine 10.

The blade height sensor 64 detects the height of the blade 20 from the ground surface GR. The blade height sensor 64 outputs the detection result to the ECU 44. Under the control of the ECU 44, the blade height adjustment motor 100 is driven, and the blade 20 vertically moves, thereby adjusting the height from the ground surface GR.

Magnetic sensors 66 (a right magnetic sensor 66R and a left magnetic sensor 66L) are arranged at symmetrical positions to each other in the left-and-right direction of the autonomous work machine 10. Each magnetic sensor outputs a signal indicating the magnitude of the magnetic field (magnetic field strength) to the ECU 44.

The outputs from the various sensors S are input to the ECU 44 via the I/O 44b. Based on the outputs from the various sensors S, the ECU 44 supplies power from the battery 32 to the travel motors 26, the work motor 22, and the height adjustment motor 100. The ECU 44 controls the travel motors 26 by outputting a control value via the I/O 44b, thereby controlling travel of the autonomous work machine 10. The ECU 44 also controls the height adjustment motor 100 by outputting a control value via the I/O 44b, thereby controlling the height of the blade 20. Furthermore, the ECU 44 controls the work motor 22 by outputting a control value via the I/O 44b, thereby controlling the rotation of the blade 20. The I/O 44b can function as a communication interface (communication unit), and can wirelessly communicate with a server 350 via a network 320.

A date and time information database SD1 that stores date and time information which indicates the sunshine hours and an azimuth information database SD2 that stores azimuth information of the sun corresponding to the sunshine hours are stored in the server 350. The date and time information database SD1 and the azimuth information database SD2 are databases stored in advance in the server 350, and the I/O 44b (communication unit) of the autonomous work machine 10 can store (download) the databases SD1 and SD2 obtained from the server 350 in the memory 44c. The CPU 44a can refer to the databases SD1 and SD2 stored in the memory 44c and execute various kinds of processing.

Note that instead of downloading the databases SD1 and SD2 from the server 350, the I/O 44b (communication unit) of the autonomous work machine 10 can also obtain predetermined data by referring to the databases SD1 and SD2 in the server 350 by executing wireless communication with the server 350.

A work area database SD3 that stores backlight information related to a work area where the autonomous work machine 10 will actually work is also stored in the server 350. Here, backlighting refers to a state in which the camera is faced toward the direction of a light source (for example, the sun) or a state in which the camera is faced toward a direction close to the direction of the light source while image capturing of the external world is performed by each camera 11. Backlighting can occur in a state in which the direction (optical axis) of each camera 11 matches the azimuth of the sun or a state in which the sun is positioned within a range of a predetermined angle of view of each camera 11.

In addition, backlight information is information that indicates the generation conditions (the azimuth of the sun and the imaging date and time, the position, and the direction (azimuth) of the autonomous work machine 10 in the work area) of backlighting that occurred in a work area. The work area database SD3 is a database generated based on the information collected while the autonomous work machine 10 is working, and is stored in the memory 44c. The I/O 44b (communication unit) stores the generated work area database SD3 in the storage unit of the server 350. By storing the work area database SD3 in the server 350 on the network 320, the information of the work area database SD3 can be shared among a plurality of autonomous work machines 10 and 15 that are working in the same work area.

In FIG. 2, the other autonomous work machine 15 is an autonomous work machine that works in the same work area as the work area in which the autonomous work machine 10 actually works, and has an arrangement similar to the autonomous work machine 10. The other autonomous work machine 15 can wirelessly communicate with the server 350 via the network 320, and the other autonomous work machine 15 can refer to the work area database SD3 to obtain the backlight information that indicates the conditions in which backlighting occurred in the work area.

The ECU 44 includes a determination unit C1, a control unit C2, a generation unit C3, and an obtainment unit C4 as functional components of the CPU 44a for implementing the present invention by reading out and executing programs stored in the memory 44c. The functional components C1 to C4 of the autonomous work machine 10 will be described in detail later.

The determination unit C1 determines whether backlighting has occurred based on images captured by the cameras 11. Also, the determination unit C1 can further determine whether backlighting has occurred by comparing the imaging date and time information of the autonomous work machine and the date and time information obtained from the date and time information database, which stores the date and time information indicating the sunshine hours. Furthermore, the determination unit C1 can further determine whether backlighting has occurred by comparing the azimuth information obtained from the azimuth information database, which stores the azimuth information of the sun corresponding to the date and time information, and the imaging date and time information, the position information, and the direction information of the autonomous work machine 10.

If the determination unit C1 determines that backlighting has occurred, the control unit C2 will control the autonomous work machine 10 to avoid the backlighting (execution of backlight avoidance control). A more specific example of backlight avoidance control will be described later.

In addition, if the determination unit C1 determines that backlighting has not occurred, the control unit C2 will execute normal control. In this case, the control unit C2 will control the autonomous work machine 10 so that the autonomous work machine will execute predetermined work in a work area AR while autonomously traveling in the work area AR based on set predetermined tracks. Alternatively, when the charge amount of the battery 32 has become equal to or less than a threshold, the control unit C2 will execute control to make the autonomous work machine return to the charging station ST.

The generation unit C3 will generate, when the determination unit C1 has determined the occurrence of backlighting, the work area database SD3 that associates the azimuth information of the sun with the imaging date and time information, the position information, and the direction information of the autonomous work machine 10. After the generation unit C3 has stored the generated work area database SD3 in the memory 44c, the I/O 44b will cause the generated work area database SD3 to be stored in the storage unit of the server 350. By storing the work area database SD3 in the server 350 on the network 320, the information of the work area database SD3 can be shared among the plurality of autonomous work machines that are working in the same work area.

The obtainment unit C4 obtains, based on the date and time information, the azimuth information of the sun, and the imaging date and time information of the autonomous work machine 10, sun information that indicates the position or the azimuth of the sun in which backlighting can occur while the autonomous work machine is traveling in the work area.

(Usage Example of Autonomous Work Machine 10)

Figure 3:
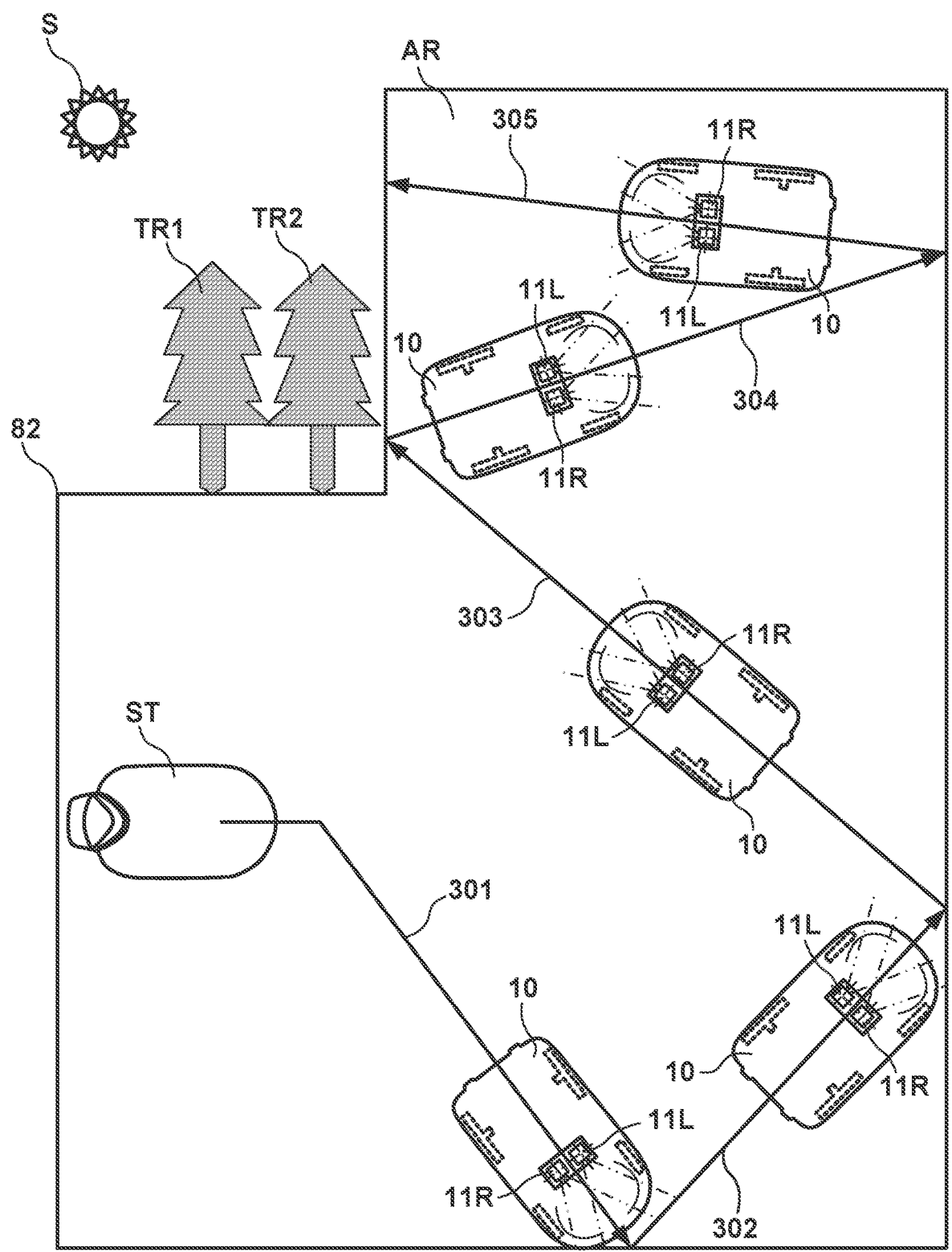
FIG. 3 is a schematic view showing an example of using an autonomous work machine 10.

FIG. 3 is a schematic view showing an example of usage of the autonomous work machine 10. As shown in FIG. 3, the work area AR is delineated by an area wire (electrical wire) 82 installed along the perimeter (boundary) of the work area AR. The ECU 44 of the autonomous work machine 10 can recognize (grasp) the boundary of the work area AR by performing, before executing work in the work area AR, a trace travel operation around the perimeter of the work area AR based on the magnetic field of the area wire 82. An area map that indicates the outer shape of the work area is generated by the trace travel operation. The autonomous work machine 10 can execute predetermined work in the work area AR while autonomously traveling in the work area AR in accordance with a generated area map. Note that the autonomous work machine 10 can detect the boundary of the work area AR based on the information from the cameras 11.

The charging station ST for charging the battery 32 included in the autonomous work machine 10 is installed inside the work area AR, and the autonomous work machine 10 that has started moving from the charging station ST will travel in the work area AR along a predetermined track. In FIG. 3, reference symbol S indicates the sun, and reference symbols TR1 and TR2 are trees growing near the boundary of the work area AR.

When the autonomous work machine 10 starts moving from the charging station ST, the cameras 11 (11L and 11R) start capturing the external world. Here, whether backlighting has occurred will be determined by the determination unit C1 based on the images captured by the cameras 11. Tracks 301 and 304 shown in FIG. 3 are tracks in a direction in which the autonomous work machine will move with its back toward the sun S, and backlighting will not occur in the travel along the tracks 301 and 304 since the light from the sun S will not fall in the angle of view of each of the cameras 11 (11L and 11R).

Also, in the travel along a track 302, the sun S will be positioned on the left side of the autonomous work machine 10 with respect to the direction of movement of the autonomous work machine 10. Hence, backlighting will not occur because the light from the sun S will not fall in the angle of view of each of the cameras 11 (11L and 11R).

The travel along a track 303 is a movement toward the direction of the sun S. However, in a case in which the light from the sun S is shielded by the trees TR1 and TR2 near the boundary of the work area AR, backlighting will not occur because the light from the sun S will not fall in the angle of view of each of the cameras 11 (11L and 11R).

However, since the latitude and the longitude of the sun S will differ depending on the date and time (month, day, and time) even when the same track 303 is to be traveled, there can be a case in which backlighting will occur because the light from the sun S will fall in the angle of view of each of the cameras 11 (11L and 11R) without being influenced by the trees TR1 and TR2. If the determination unit C1 determines that backlighting has occurred, the generation unit C3 will store, in the work area database SD3, information obtained by associating the azimuth information of the sun with the imaging date and time information, the position information, and the direction information of the autonomous work machine 10. As a result, the generation conditions (the azimuth of the sun and the imaging date and time, the position, and the direction (azimuth) of the autonomous work machine 10 in the work area) of the backlighting that occurred in the work area AR can be accumulated as unique information of the work area AR. Hence, it will be possible to more accurately determine whether backlighting has occurred in accordance with the actual state of the work by referring to the work area database SD3, and this determination can be reflected in the backlight suppression control. If the determination unit C1 determines that backlighting has occurred, the control unit C2 will control the autonomous work machine 10 to avoid the backlighting (execution of backlight avoidance control).

Travel along a track 305 is a movement toward the direction of the sun S. Since the light from the sun S will not be shielded by the trees TR1 and TR2 in the track 305, backlighting can occur because the light from the sun S will fall in the angle of view of each of the cameras 11 (11L and 11R).

In a case in which the determination unit C1 determines that the backlighting has occurred, the generation unit C3 will store, in the work area database SD3 of the memory 44c, the information obtained by associating the azimuth information of the sun with the imaging date and time information, the position information, and the direction information of the autonomous work machine 10. Subsequently, when the determination unit C1 determines that backlighting has occurred, the control unit C2 will control the autonomous work machine 10 to avoid the backlighting (execution of backlight avoidance control).

(Processing Procedure of Autonomous Work Machine 10)

Figure 4:
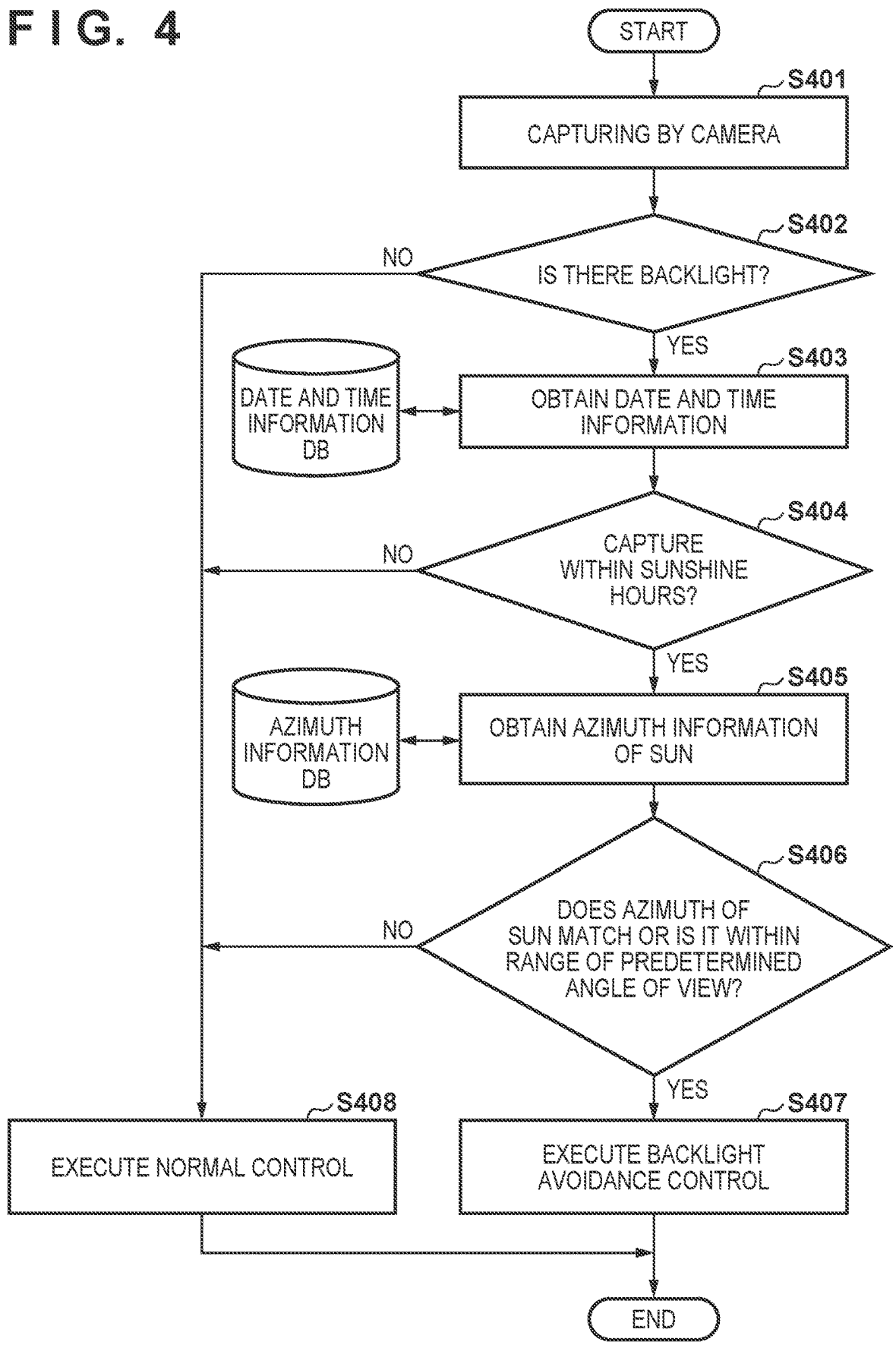
FIG. 4 is a flowchart for explaining a processing procedure executed by the autonomous work machine.

FIG. 4 is a flowchart for explaining the processing procedure executed by the autonomous work machine 10. The processing procedure of FIG. 4 is executed by the functional components (the determination unit C1, the control unit C2, and the generation unit C3) under the overall control of the ECU 44 of the autonomous work machine 10 shown in FIG. 2.

First, in step S401, when the autonomous work machine 10 starts moving from the charging station ST, the cameras 11 (11L and 11R) will start capturing the external world. Each camera 11 can capture a moving image at a predetermined frame rate, and the images captured by the cameras 11 (11L and 11R) are input to the determination unit C1 and the ECU 44 via the I/O 44b.

In step S402, whether backlighting has occurred is determined by the determination unit C1 based on an image captured by each camera 11. Determination conditions are, for example, (1) a case in which an extremely bright portion that exceeds a predetermined threshold is present in the image, (2) a case in which there is no parallax between the left camera 11L and the right camera 11R and an object cannot be recognized in the image (a case in which distance information between the autonomous work machine 10 and the object cannot be obtained), (3) a case in which the captured image matches or is similar to a glare image, which indicates a scene of a backlit state pre-registered in the memory 44c, within a range of a predetermined similarity, (4) a case in which the periphery of a bright portion is dark and the difference between the bright portion and the dark portion is equal to or more than a predetermined threshold in the image, (5) a case in which the white balance exceeds a predetermined threshold, and the like. Whether backlighting has occurred can be determined by the determination unit C1 based on these determination conditions (1) to (5).

If the determination unit C1 determines that backlighting has not occurred (NO in step S402), the control unit C2 will advance the process to step S408, and the control unit C2 will execute normal control in step S408. That is, based on the set predetermined tracks (for example, the track 301 to track 304 of FIG. 3), the control unit C2 will control the autonomous work machine 10 so that the autonomous work machine will execute predetermined work while autonomously traveling in the work area AR. Alternatively, in a case in which the charge amount of the battery 32 has become equal to or less than the threshold, the autonomous work machine 10 will be controlled to return to the charging station ST.

On the other hand, if the determination unit C1 determines that backlighting has occurred in the determination process of step S402, the process advances to step S403.

In step S403, the determination unit C1 obtains the date and time information. The determination unit C1 may obtain the date and time information by, for example, referring to the date and time information database SD1 of the server 350 or by obtaining the date and time information downloaded in the memory 44c.

In step S404, the determination unit C1 determines whether image capturing by the cameras 11 has been performed within sunshine hours. The determination unit C1 can obtain, based on the work schedule of the autonomous work machine 10 stored in the memory 44c or the information of an internal clock included in the CPU 44a, the information (imaging date and time information) of the date and the time of the image capturing operation when the image capturing is actually performed.

The determination unit C1 determines whether the image capturing operation is an image capturing operation performed within sunshine hours by comparing the imaging date and time information of the autonomous work machine 10 with the date and time information obtained from the date and time information database SD1, which stores the date and time information indicating the sunshine hours. For example, in a case in which sunshine hours are defined to be T1 (6:00) to T2 (18:00) as sunshine information when the imaging date is X (month)/Y (day), backlighting can occur if the imaging date and time information (an imaging time T3 of X (month)/Y (day) (for example, 14:00)) of the autonomous work machine 10 is within the sunshine hours. In such a case, the determination unit C1 will determine that backlighting has occurred (YES in step S404), and advance the process to step S405.

On the other hand, since backlighting cannot occur if the imaging time T3 (for example, 5:30 or 18:30) of the autonomous work machine 10 is outside the sunshine hours, the detection can be determined to be a detection error. In this case, the determination unit C1 will determine that backlighting has not occurred (NO in step S404), and the control unit C2 will advance the process to step S408 to execute normal control.

Note that backlighting can also occur when the state of the external world changes. For example, if the trees that shield the sunlight have grown, a state in which backlighting will not occur even during the sunshine hours can be generated. Also, on the other hand, even in a case in which backlighting did not occur in a previous state, if the trees in the periphery of the work area are cut down, a state in which backlighting will occur can be generated. Cases in which backlighting will occur or not occur can be generated in accordance with various kinds of changes in the state of the external world, such as building of a new house, demolishing of a house, or the like in the vicinity of the work area. When a detection error has been determined for a predetermined number of times, the determination unit C1 will determine that the state of the external world has changed and update the information of the work area database SD3. As a result, each change in the state of the external world of each individual work area to be worked by the autonomous work machine 10 can be reflected in the backlighting determination result.

In step S405, the determination unit C1 obtains the azimuth information of the sun. The determination unit C1 may obtain the azimuth information of the sun by, for example, referring to the azimuth information database SD2 of the server 350 or by obtaining the azimuth information downloaded in the memory 44c.

In step S406, the determination unit C1 compares the imaging date and time information, the position information, and the direction information of the autonomous work machine 10 with the azimuth information obtained from the azimuth information database SD2, which stores the azimuth information of the sun corresponding to the date and time information. As a result of the comparison, if the azimuth of the sun S matches the direction of each camera 11 or the azimuth of the sun S falls within a predetermined range of the angle of view of each of the cameras 11 (11L and 11R), it can be determined that backlighting will occur. In such a case, the determination unit C1 will determine that backlighting has occurred (YES in step S406), and advance the process to step S407.

On the other hand, as a result of the comparison, if the azimuth of the sun S does not match the direction of each camera 11 or the azimuth of the sun S falls outside the range of the predetermined angle of view of each of the cameras 11 (11L and 11R), the detection can be determined to be an detection error because backlighting will not occur. In such a case, the determination unit C1 will determine that backlighting has not occurred (NO in step S406), and the control unit C2 will advance the process to step S408 to execute normal control.

In step S407, if the determination unit C1 has determined that backlighting has occurred, the control unit C2 will control the autonomous work machine 10 to avoid the backlighting (execution of backlight avoidance control).

(More Specific Example of Backlight Avoidance Control)
(On-the-Spot Turn and Traveling while Turning)

A more specific example of backlight avoidance control will be described with reference to FIGS. 5 to 8. In a case in which the determination unit C1 has determined that backlighting has occurred, the control unit C2 will cause the autonomous work machine 10 to turn so as to prevent the sun from falling within the range of the angle of view of each camera 11. Two turn modes, an on-the-spot turn mode and an advancing-while-turning mode, are used here to execute a turn.

Figure 5:
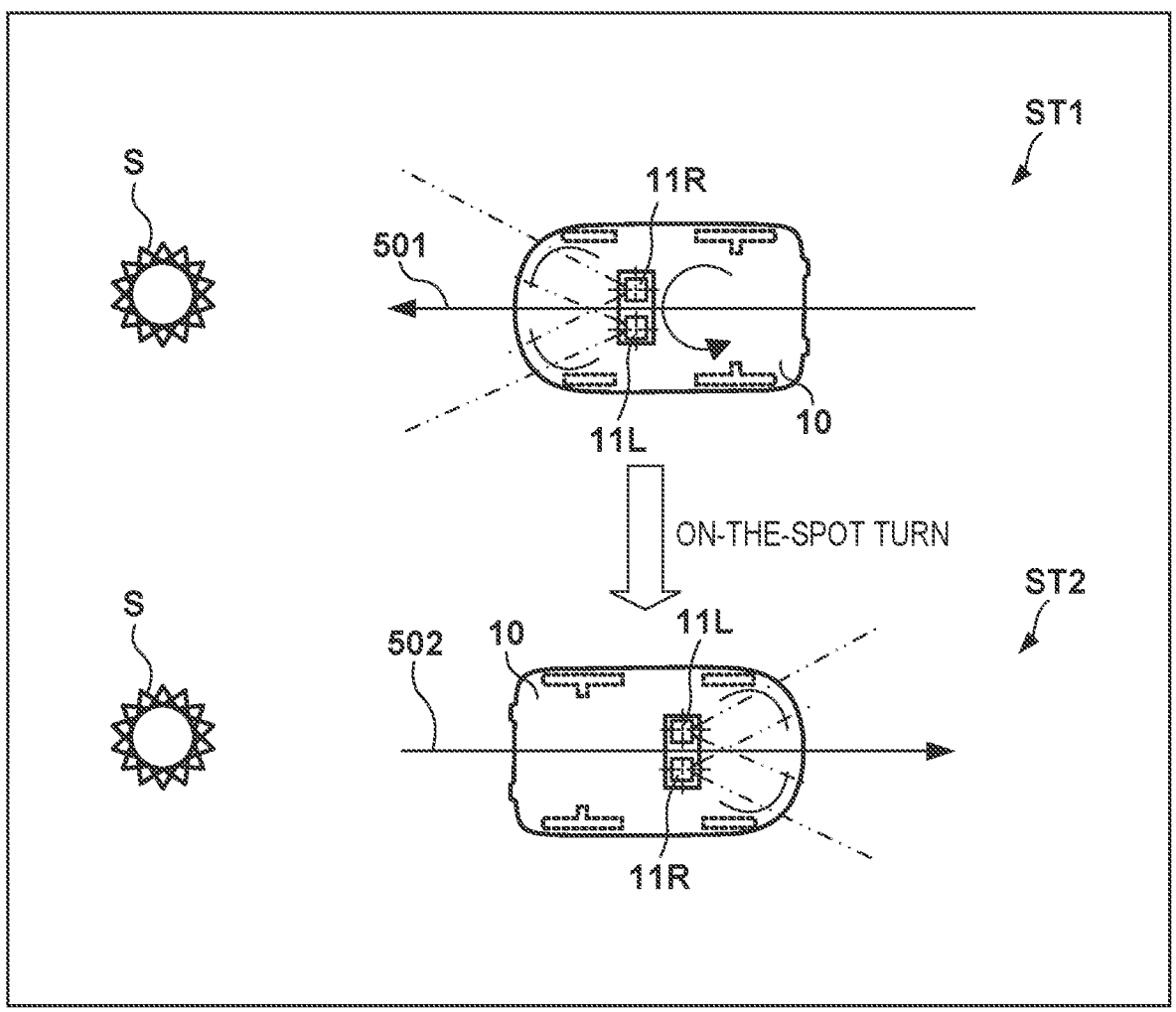
FIG. 5 is a view for schematically explaining an on-the-spot turn mode.

FIG. 5 is a view for schematically explaining the on-the-spot turn mode. In FIG. 5, a state ST1 shows a state in which the determination unit C1 has determined that backlighting has occurred while the autonomous work machine 10 is traveling along a track 501. In this case, the control unit C2 will make the autonomous work machine 10 turn on the spot where it is present on the track 501 to prevent the sun from falling within the range of the angle of view of each of the cameras 11 (11L and 11R). A state ST2 shows a state in which the autonomous work machine 10 has made an on-the-spot turn on the track 501. The autonomous work machine 10 that has made the on-the-spot turn will travel along a track 502 (move with its back toward the sun S) which is in the reverse direction of the track 501. Since the azimuth of the sun S will fall outside the range of the angle of view of each of the cameras 11 (11L and 11R), backlighting can be avoided.

Figure 6:
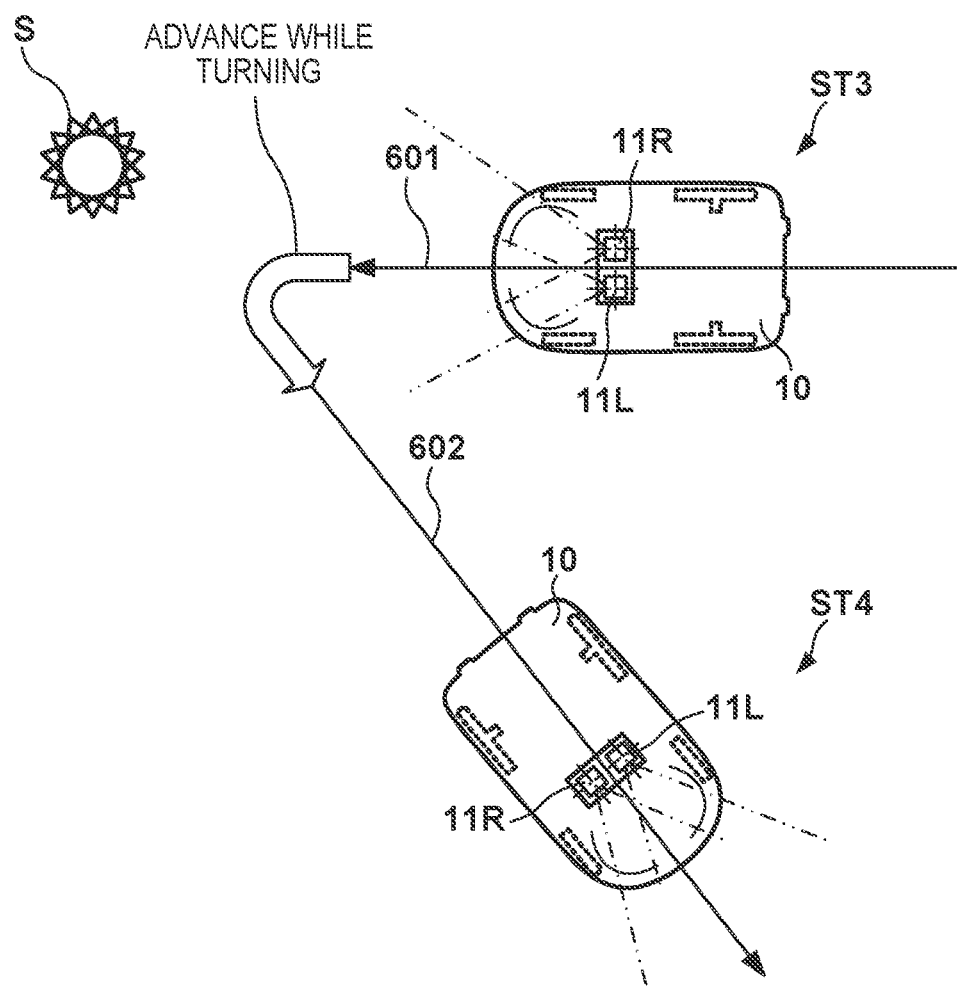
FIG. 6 is a view for schematically explaining a turn mode in which the autonomous work machine advances while turning.

FIG. 6 is a view for schematically explaining the advancing-while-turning mode. In FIG. 6, a state ST3 shows a state in which the determination unit C1 has determined that backlighting has occurred while the autonomous work machine 10 is traveling along a track 601. In this case, the control unit C2 will control the autonomous work machine 10 to advance while taking a track for turning so the sun will not fall within the range of the angle of view of each of the cameras 11 (11L and 11R). A state ST4 shows a state in which the autonomous work machine 10 is traveling along a track 602 after turning. The autonomous work machine 10 that advances while turning travels along the track 602 which is in a direction in which the autonomous work machine will move with its back toward the sun S. Since the azimuth of the sun S will fall outside the range of the angle of view of each of the cameras 11 (11L and 11R), backlighting can be avoided.

By controlling the autonomous work machine 10 so that the autonomous work machine will turn on the spot or travel while turning, the autonomous work machine can avoid being backlit while continuing work in the work area AR. As a result, it will be possible to prevent a detection error in the external world information.

Figure 7:
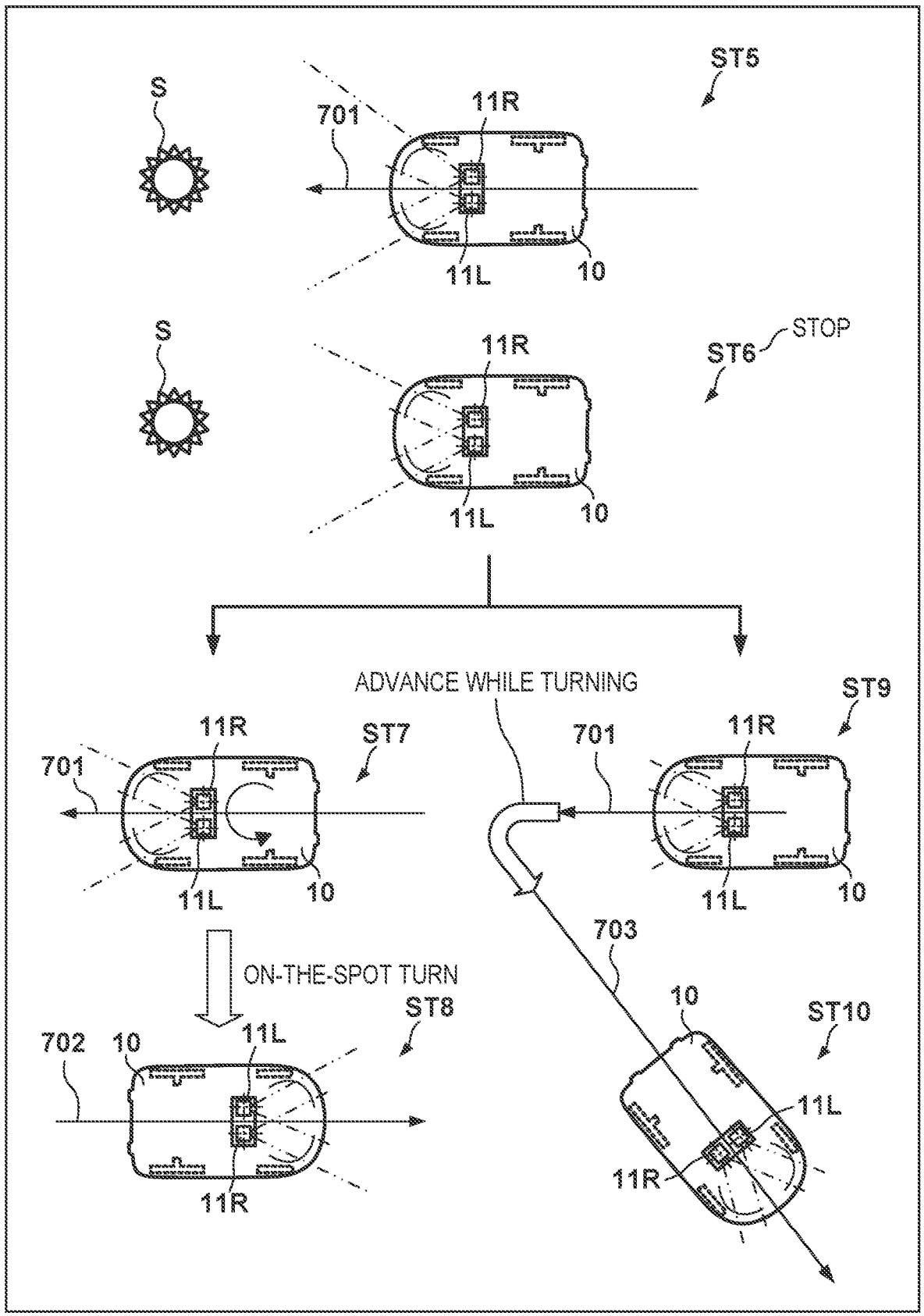
FIG. 7 is a view for explaining a transition to the on-the-spot turn mode or the advancing-while-turning mode.

FIG. 7 is a view for schematically explaining control for stopping the autonomous work machine 10 and determining which turn mode to transition before transitioning to the on-the-spot turn mode or the advancing-while-turning mode.

In FIG. 7, a state ST5 shows a state in which the determination unit C1 has determined that backlighting as occurred while the autonomous work machine 10 is traveling along the track 501. A state ST6 shows a state in which the control unit C2 has stopped the autonomous work machine 10 when the determination unit C1 has determined that the backlighting has occurred. In this case, the control unit C2 will select either the on-the-spot turn mode or the advancing-while-turning mode based on the position and the direction (azimuth) of the autonomous work machine 10, the azimuth information of the sun S, and the date and time information. For example, in a case in which the sun S is positioned at an azimuth toward the front of the autonomous work machine 10, the on-the-spot turn mode will be selected since the autonomous work machine 10 will move with its back toward the sun S. Alternatively, in a case in which the sun S is positioned at an azimuth toward the side of the autonomous work machine 10, the advancing-while-turning mode will be selected so that the autonomous work machine will move with its back toward the sun S.

The state will transition to states ST7 and ST8 in a case in which the on-the-spot turn mode is selected. The state ST7 shows a state in which the autonomous work machine has started to turn from the state of the state ST6 (stopped state). In this case, the control unit C2 will control the autonomous work machine 10 to make an on-the-spot turn on a track 701 so the sun will not fall within the range of the angle of view of each of the cameras 11 (11L and 11R). The state ST8 shows a state in which the autonomous work machine 10 has made an on-the-spot turn on the track 701. The autonomous work machine 10 that has made an on-the-spot turn will travel (move with its back toward the sun S) along a track 702 in the reverse direction of the track 701. Since the azimuth of the sun S will fall outside the range of the angle of view of each of the cameras 11 (11L and 11R), backlighting can be avoided.

The state will transition to states ST9 and ST10 in a case in which the advancing-while-turning mode is selected. The state ST9 shows a control state in which the autonomous work machine 10 has started moving along the track 701 from the state ST6 (stopped state) and advances while taking a track for turning so the sun S will not fall within the range of the angle of view of each of the cameras 11 (11L and 11R). The state ST10 shows a state in which the autonomous work machine 10 is traveling along a track 703 after turning. The autonomous work machine 10 that advances while turning will travel along the track 703 in a direction in which the autonomous work machine will move with its back toward the sun S. Since the azimuth of the sun S will fall outside the range of the angle of view of each of the cameras 11 (11L and 11R), backlighting can be avoided. Since the control of the autonomous work machine is started to avoid the backlighting after temporarily stopping, it will be possible to obtain the information of the external world with greater accuracy than a case in which control for avoiding the backlight is performed while the autonomous work machine is moving, and the autonomous work machine can be controlled based on the obtained external world information. However, the temporary stop may also be omitted.

(Track Correction after Turn)

Figure 8:
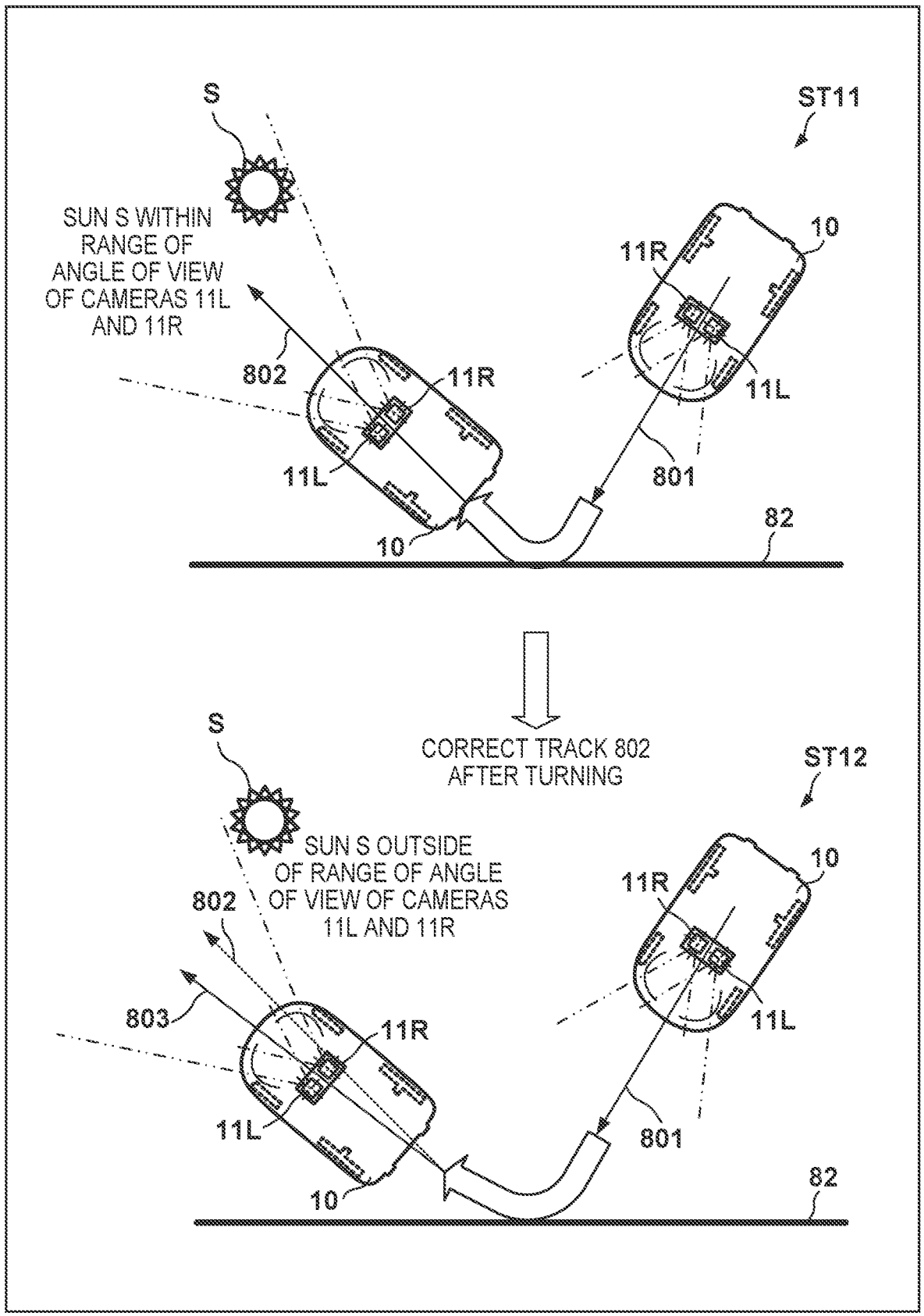
FIG. 8 is a view for schematically explaining control for correcting a track by backlight avoidance control after a turn has been performed under normal control.

FIG. 8 is a view for schematically explaining control for correcting a track by backlight avoidance control after a turn has been performed under normal control. A state ST11 shows a state in which the autonomous work machine 10 is traveling along a track 801 and sets, when the autonomous work machine has come close to the boundary (the area wire 82) of the work area AR, a track 802 to turn at a predetermined turning angle. In a case in which the autonomous work machine 10 travels along the track 802, the sun S will fall within the range of the angle of view of each of the cameras 11 (11L and 11R), and backlighting will occur in the travel along the track 802.

A state ST12 shows a state in which the control unit C2 has corrected, when the determination unit C1 has determined that backlighting has occurred in the track 802, the preset track 802 into a track 803 in which the turning angle has been returned to a direction in which backlighting can be avoided. In a case in which the autonomous work machine 10 travels along the corrected track 803, the sun S will not fall within the range of the angle of view of each of the cameras 11 (11L and 11R), and backlighting can be avoided.

If the autonomous work machine continues to travel based on a track that does not travel toward the sun S, it may skew a worked area in the work area. However, by correcting the preset track 802 into the track 803 set by returning the turning angle to a direction that will barely make the position of the sun S fall outside of a backlighting position, the skewing of the worked area can be prevented.

(Modification)

The first embodiment described, as an example of backlight avoidance control, an example in which the autonomous work machine 10 is made to turn or the track after the turn is corrected. However, the direction of each of the cameras 11 (11L and 11R) may also be corrected. In a case in which the determination unit C1 has determined that backlighting has occurred, the control unit C2 can control the angle of each of the cameras 11 (11L and 11R) so that the sun will not fall within the range of the angle of view of each of the cameras 11 (11L and 11R). Each of the cameras 11 (11L and 11R is held by the pan angle adjustment mechanism 11b for adjusting the angle in the horizontal direction and the tilt angle adjustment mechanism 11c for adjusting the angle in the vertical direction. The control unit C2 can control at least one of the pan angle adjustment mechanism 11b and the tilt angle adjustment mechanism 11c and control the angle of each of the cameras 11 (11L and 11R) to avoid backlighting. For example, the pan angle adjustment mechanism 11b can change the angle of each camera 11 in the horizontal direction or the tilt angle adjustment mechanism 11c can change the angle of each camera 11 in a downward direction. By avoiding backlighting by controlling the angle of each camera while continuing the execution of work, it will be possible to prevent a detection error in the external world information.

Second Embodiment

The first embodiment descried an arrangement in which a determination unit C1 determines whether backlighting has occurred and an autonomous work machine 10 is controlled to avoid backlighting when the occurrence of backlighting was determined. The second embodiment will describe an arrangement in which a control unit C2 will set the track of the autonomous work machine 10 so that backlighting can be avoided. The arrangement of the autonomous work machine 10 is similar to that of the first embodiment. In this embodiment, as a functional component of the autonomous work machine 10, an obtainment unit C4 will obtain, before the autonomous work machine starts traveling and based on the date and time information, the azimuth information of the sun, and the imaging date and time information of the autonomous work machine 10, sun information that indicates the position or the azimuth of the sun which will be in a backlighting position when the autonomous work machine travels in a work area. The control unit C2 sets, based on the sun information obtained by the obtainment unit C4, a track that will allow the autonomous work machine 10 to avoid backlighting.

(Processing Procedure of Autonomous Work Machine 10)

Figure 9:
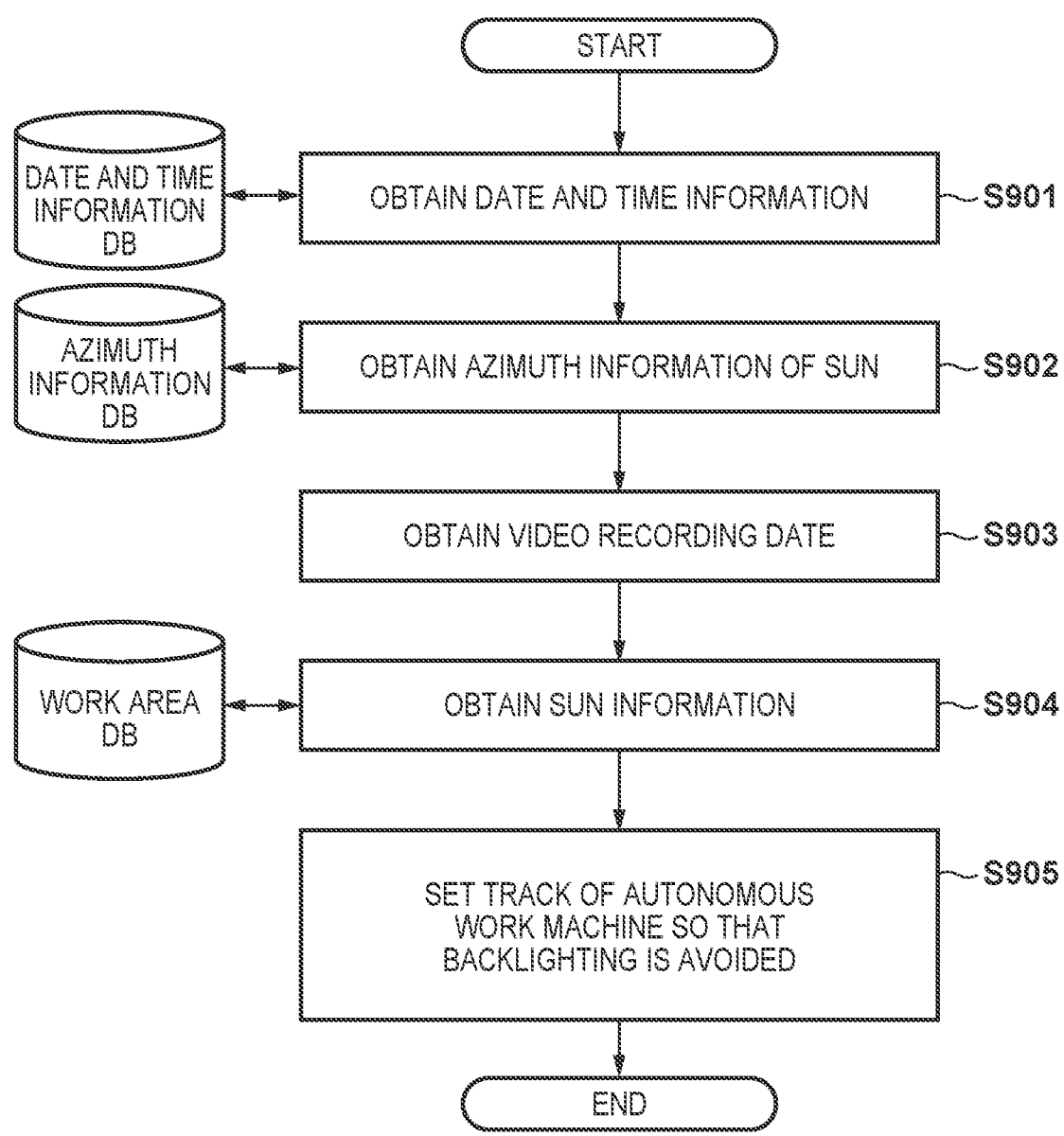
FIG. 9 is a flowchart for explaining a processing procedure executed by an autonomous work machine.

FIG. 9 is a flowchart for explaining the processing procedure executed by the autonomous work machine 10. The processing procedure of FIG. 9 is executed by the functional components (the control unit C2, a generation unit C3, and the obtainment unit C4) under the overall control of an ECU 44 of the autonomous work machine 10 shown in FIG. 2.

In step S901, the obtainment unit C4 obtains the date and time information. The obtainment unit C4 can obtain the date and time information by, for example, referring to a date and time information database SD1 of a server 350 or by obtaining the date and time information downloaded in a memory 44c.

In step S902, the obtainment unit C4 obtains the azimuth information of the sun corresponding to the date and time information. The obtainment unit C4 can obtain the azimuth information of the sun by, for example, referring to an azimuth information database SD2 of the server 350 or by obtaining the azimuth information downloaded in the memory 44c.

In step S903, the obtainment unit C4 obtains the imaging date and time information of the autonomous work machine 10. The obtainment unit C4 obtains, based on the work schedule of the autonomous work machine 10 stored in the memory 44c or the information of an internal clock included in a CPU 44a, the information (imaging date and time information) of the date and the time of the image capturing operation when the image capturing is actually performed.

In step S904, before the start of the travel and based on the date and time information obtained in step S901, the azimuth information of the sun obtained in step S902, and the imaging date and time information of the autonomous work machine 10 obtained in step S903, the sun information that indicates the position or the azimuth of the sun, which is to be in a backlighting position when the autonomous work machine is to travel in a work area AR, is obtained by the obtainment unit C4.

Also, in a case in which it is determined, after the autonomous work machine has started traveling, that a track in which backlighting will occur is present among the set tracks while the autonomous work machine is traveling in the work area AR, the generation unit C3 will generate, as the sun information, information obtained by associating the azimuth information of the sun with the imaging date and time information and the position information and the direction information on the track of the autonomous work machine 10. After the generation unit C3 has stored the generated sun information in the work area database of the memory 44c, an I/O 44b (communication unit) will cause the generated sun information to be stored in a storage unit (a work area database SD3) of the server 350.

The sun information collected/generated during the travel in the work area AR is accumulated in the work area database SD3, and the obtainment unit C4 can obtain the sun information by referring to the work area database SD3 of the server 350.

Note that in a case in which the sun information is stored in the work area database SD3 of the server 350 in the state before the autonomous work machine starts traveling, the sun information can be obtained by referring to the work area database SD3 of the server 350 regardless of the processes of step S901 to step S903.

Figure 10:
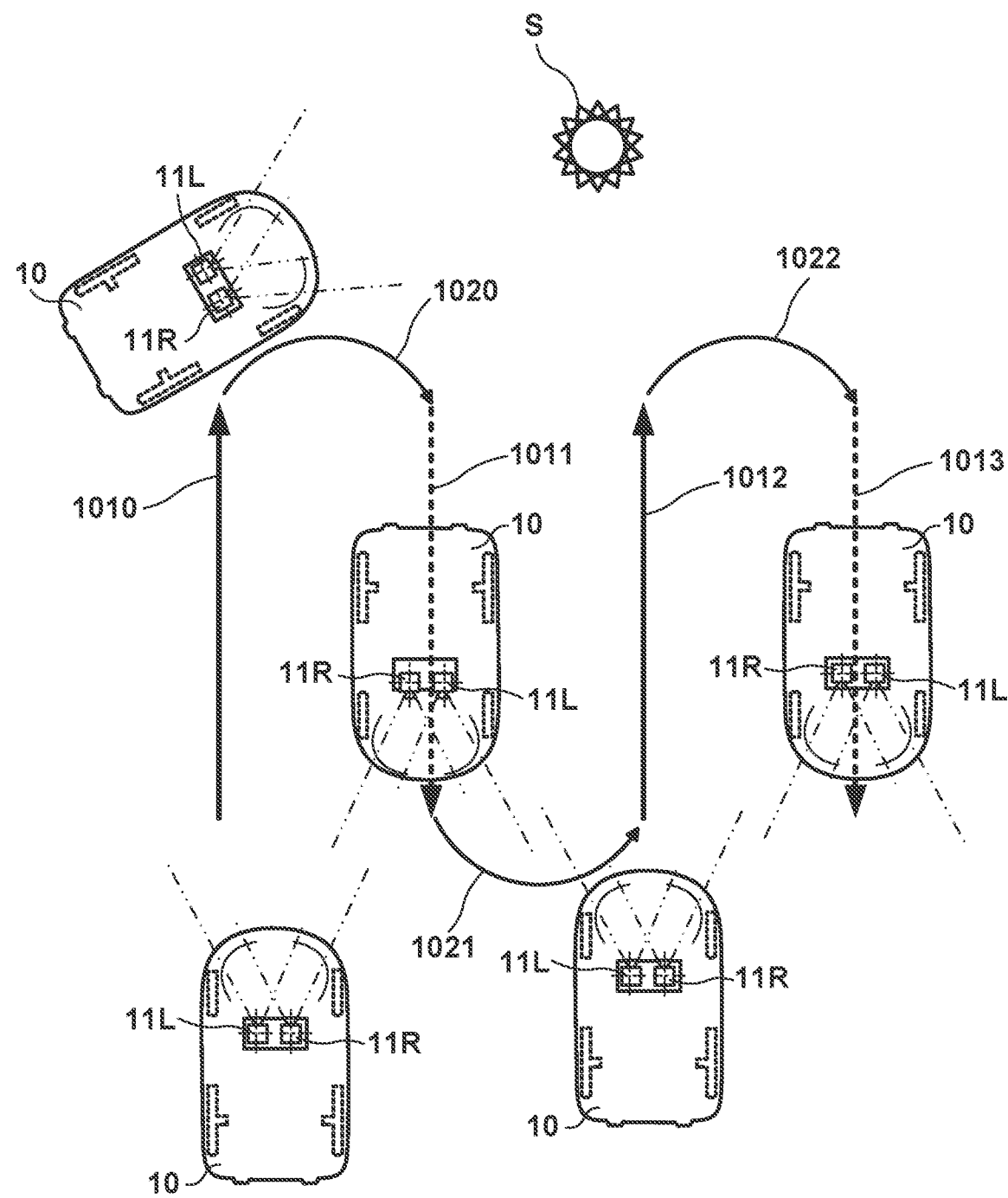
FIG. 10 is a view for schematically explaining a case in which backlighting occurs when the autonomous work machine is traveling in a work area.

FIG. 10 is a view for schematically explaining a case in which backlighting will occur when the autonomous work machine is traveling in the work area AR. In FIG. 10, tracks 1010 and 1012 indicated by solid lines are tracks toward a sun S, tracks 1020, 1021, and 1022 are tracks for turning, and tracks 1011 and 1013 indicated by broken lines are tracks in which the back of the autonomous work machine will be toward the sun S.

In FIG. 10, in a case in which the autonomous work machine is to travel along the tracks 1011 and 1013, the sun S will not fall within the range of the angle of view of each of the cameras 11 (11L and 11R), and backlighting will not occur. However, in a case in which the autonomous work machine travels along the tracks 1010 and 1012, the sun S will fall within the range of the angle of view of each of the cameras 11 (11L and 11R), and backlighting will occur. In addition, the sun S will fall within the range of the angle of view of each of the cameras 11 (11L and 11R) on the track for turning of the tracks 1020 and 1022, and backlighting will occur if the autonomous work machine travels along the track 1020. In the tracks shown in FIG. 10, the sun S will fall within the range of the angle of view of each of the cameras 11 (11L and 11R) four times (the tracks 1010, 1020, 1012, and 1022), and the duration of backlighting in each of the linear tracks 1010 and 1012, with a longer travel distance than a track for turning, will be longer than that of the track for turning.

In step S905, the control unit C2 will use the sun information obtained by the obtainment unit C4 to set each track of the autonomous work machine 10 so that backlighting can be avoided. The control unit C2 sets the track so that the duration of backlighting or the number of times in which the sun S will fall into the range of the angle of view of each of the cameras 11 (11L and 11R) will be reduced.

Figure 11:
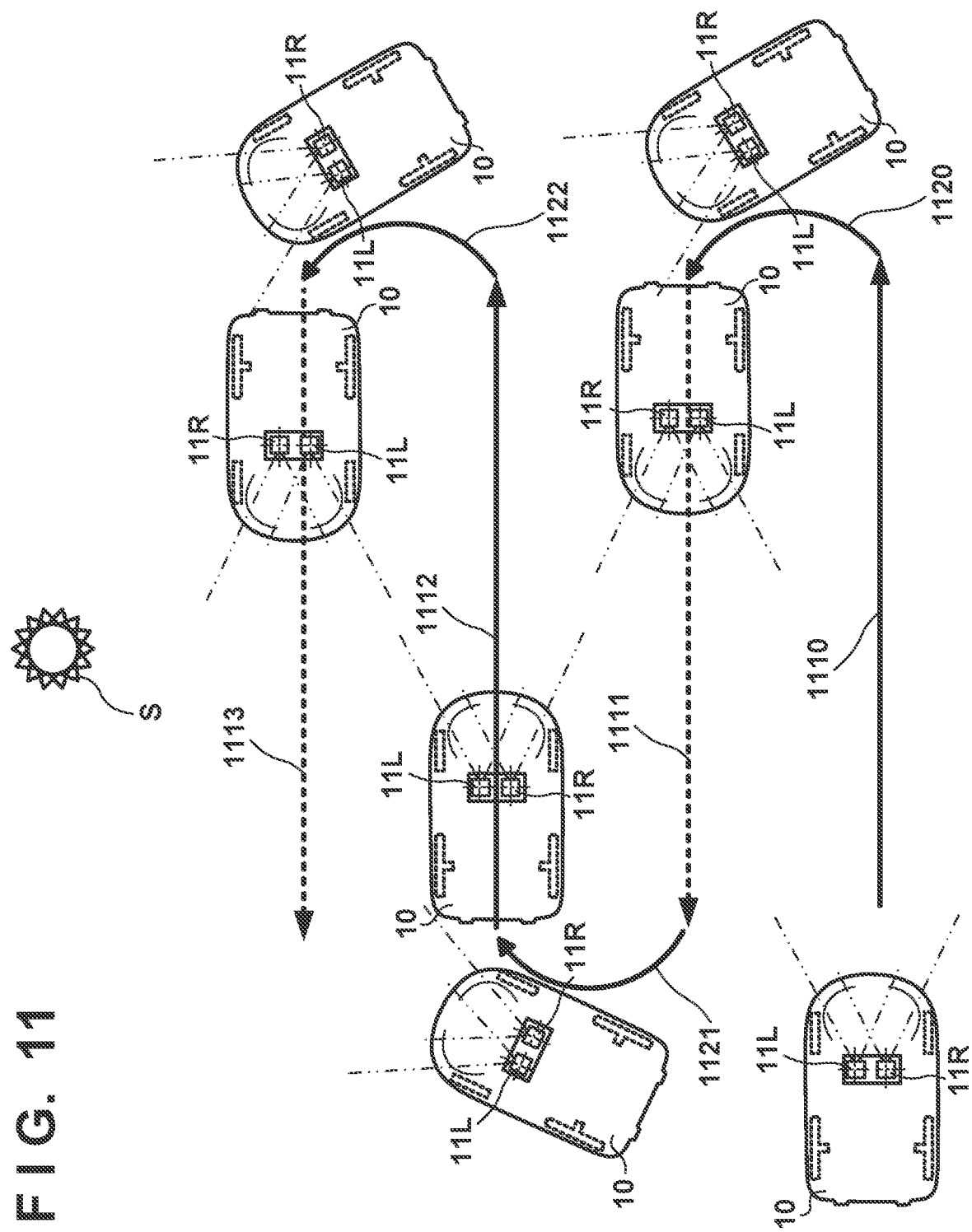
FIG. 11 is a view for schematically explaining the setting of a track that avoids backlighting.

FIG. 11 is a view for schematically explaining the setting of a track that avoids backlighting. The control unit C2 sets the track so as to prevent a track in which the autonomous work machine will be faced toward the sun S. In FIG. 11, tracks 1110 and 1112 are tracks in which the sun S is positioned to the left side of the autonomous work machine 10. When the autonomous work machine travels along the tracks 1110 and 1112, the sun S will not fall within the range of the angle of view of each of the cameras 11 (11L and 11R), and backlighting will not occur. In addition, tracks 1111 and 1113 indicated by broken lines are tracks in which the position of the sun S is on the right side of the autonomous work machine 10. Even when the autonomous work machine travels along the tracks 1111 and 1113, the sun S will not fall within the range of the angle of view of each of the cameras 11 (11L and 11R) c11, and backlighting will not occur.

Among the tracks shown in FIG. 11, a track that transitions from the track 1110 indicated by a solid line to the track 1111 indicated by broken lines is a track for turning. Also, a track 1121 is a track for turning that transitions from the track 1111 indicated by broken lines to the track 1112 indicated by a solid lines, and a track 1122 is a track for turning that transitions from the track 1112 indicated by a solid line to the track 1113 indicated by broken lines. On these tracks for turning, the sun S will fall within the range of the angle of view of each of the cameras 11 (11L and 11R), and backlighting will occur in the travel along a track 1120, the track 1121, and the track 1122.

In the tracks shown in FIG. 11, since the sun S falls into the angle of view of each of the cameras 11 (11L and 11R) three times (the tracks 1120, 1121, and 1122) and backlighting will not occur in the manner of the linear tracks 1010 and 1012 as shown in FIG. 10, the duration of backlighting will be shorter than that of the tracks (the tracks 1010, 1020, 1012, and 1022) of FIG. 10. Track setting by the control unit C2 allows backlighting to be avoided by a simple method.

(Camera Angle Control in Synchronization with Track Setting)

In FIG. 11, in the tracks 1120, 1121, and 1122 in which backlighting occurs, the control unit C2 can control the angle of each of the cameras 11 (11L and 11R) so the sun S will not fall within the range of the angle of view of each of the cameras 11 (11L and 11R). Each of the cameras 11 (11L and 11R) is held by a pan angle adjustment mechanism 11$b$ for adjusting the angle in the horizontal direction and a tilt angle adjustment mechanism 11$c$ for adjusting the angle in the vertical direction. The control unit C2 can control at least one of the pan angle adjustment mechanism 11$b$ and the tilt angle adjustment mechanism 11$c$ to control the angle of each of the cameras 11 (11L and 11R) to avoid backlighting.

The control unit C2 will control the angle of each of the cameras 11 (11L and 11R) in accordance with each of the set tracks (1110, 1111, 1112, and 1113). For example, the pan angle adjustment mechanism 11$b$ can change the angle of each camera 11 in the horizontal direction or the tilt angle adjustment mechanism 11$c$ can change the angle of each camera 11 in a downward direction, in accordance with the set track. By executing camera angle control in synchronization with the track setting of the control unit C2, the angle of each camera can be controlled in advance, together with the setting of the track, so as to prevent the sun from falling within the range of the angle of view of each camera. As a result, travel that avoids backlighting can be performed in a track set based on the sun information.

Other Embodiments

A program that implements the functions of one or more autonomous work machines described in the embodiment is supplied to a system or an apparatus via a network or a storage medium, and one or more processors in the computer of the system or the apparatus can load and execute the program. The present invention can also be implemented by such a mode.

Summary of Embodiments

Arrangement 1. An autonomous work machine according to the above-described embodiment is an autonomous work machine (for example, 10 of FIGS. 1A and 1B) that includes a camera (for example, 11 of FIG. 2) configured to capture an image of an external world, comprising:

a determination unit (for example, C1 of FIG. 2) configured to determine, based on an image captured by the camera, whether backlighting has occurred; and a control unit (for example, C2 of FIG. 2) configured to control, in a case in which the determination unit (C1) has determined that the backlighting has occurred, the autonomous work machine (10) so as to avoid the backlighting.

According to the autonomous work machine of Arrangement 1, the operation of the autonomous work machine can be controlled to avoid backlighting when the occurrence of backlighting is determined. Since accurate obtainment of information of the external world will be difficult in a backlit state, the autonomous work machine can be controlled to avoid backlighting to prevent a control error that may occur due to continuing work in a state in which the information of the external world cannot be obtained.

Arrangement 2. In the autonomous work machine according to the above-described embodiment, the control unit (C2) will cause the autonomous work machine (10) to turn so the sun will not fall within a range of an angle of view of the camera (11).

According to the autonomous work machine of Arrangement 2, a detection error about the external world information can be prevented by avoiding backlighting by making the autonomous work machine turn while continuing to work.

Arrangement 3. In the autonomous work machine according to the above-described embodiment, in a case in which an occurrence of the backlighting is determined while the autonomous work machine is traveling, the control unit (C2) will control the autonomous work machine (10) to avoid the backlighting after stopping the travel of the autonomous work machine (10).

According to the autonomous work machine of Arrangement 3, since control of the autonomous work machine is started so that the autonomous work machine will avoid backlighting after temporarily stopping, the external world information can be obtained with greater accuracy than when control is performed to avoid backlighting while moving, and the autonomous work machine can be controlled based on the obtained external world information.

Arrangement 4. In the autonomous work machine according to the above-described embodiment, whether the backlighting has occurred is further determined by the determination unit (C1) by comparing imaging date and time information of the autonomous work machine and date and time information obtained from a date and time information database (for example, SD1 of FIG. 2) which stores the date and time information indicating sunshine hours, and in a case in which the occurrence of the backlighting is determined, the control unit controls the autonomous work machine to avoid the backlighting.

According to the autonomous work machine of Arrangement 4, it is possible to prevent a detection error about backlighting from being generated. For example, in a case in which the imaging date is X (month)/Y (day), the sunshine hours are defined to be from T1 to T2. If the imaging date and time information (the imaging time T3 of X (month)/Y (day)) of the autonomous work machine is within the sunshine hours, backlighting can occur. However, if the imaging time T3 is outside the sunshine hours, the detection can be determined to be an error since backlighting cannot occur. In such a case, backlight avoidance control need not be executed.

According to the autonomous work machine of Arrangement 4, backlighting can be detected more accurately, and the control unit can determine, based on the detection result, whether to execute backlight avoidance control. As a result, unnecessary execution of backlight avoidance control can be suppressed.

Arrangement 5. In the autonomous work machine according to the above-described embodiment, whether the backlighting has occurred is further determined by the determination unit (C1) by comparing the imaging date and time information, position information, and direction information of the autonomous work machine (10) and azimuth information obtained from an azimuth information database (for example, SD2 of FIG. 2) which stores the azimuth information of the sun corresponding to date and time information, and in a case in which the occurrence of the backlighting is determined, the control unit (C2) controls the autonomous work machine to avoid the backlighting.

According to the autonomous work machine of Arrangement 5, it is possible to prevent a detection error about backlighting from being generated. The azimuth information corresponding to the date and time information includes information of the azimuth (latitude and longitude) of the position of the sun in the country where image capturing was performed. It can be determined that backlighting has occurred if the information of the azimuth of the sun at the imaging date and time matches the information (the position information and the azimuth information of the autonomous work machine at the imaging date and time) of a high luminance portion in an image captured by the camera. Since backlighting cannot occur if these pieces of information do not match, the detection can be determined to be an error. Hence, it will be possible to prevent a high luminance portion, for example, illumination light or the like, in an image captured by the camera from being detected as backlighting by the sun. Since the camera will be able to obtain the external world information in the case of illumination light or the like, backlight avoidance control need not be executed.

According to the autonomous work machine of Arrangement 5, backlighting can be detected more accurately, and the control unit can determine, based on the detection result, whether to execute backlight avoidance control. As a result, unnecessary execution of backlight avoidance control can be suppressed.

Arrangement 6. The autonomous work machine according to above-described embodiment further comprises:
a generation unit (for example, C3 of FIG. 2) configured to generate, in a case in which the occurrence of the backlighting is determined, a work area database (for example, SD3 of FIG. 2) that associates the azimuth information of the sun with the imaging date and time information, the position information, and the direction information of the autonomous work machine (10),
wherein the determination unit (C1) refers to the work area database (SD3) based on the imaging date and time information, the position information, and the direction of the autonomous work machine when the autonomous work machine is working in a work area, and determines whether the backlighting has occurred.

The date and time information database and the azimuth information database are databases for storing the information of sunshine hours and the azimuth information of the sun, respectively, for each wide-range area, for example, for each country. In the case of a large country, the sunshine hours and the position of the sun can greatly vary for each region in the country. Hence, in some cases, the conditions in which backlighting will occur may be difficult to obtain, in correspondence with the latitude and the longitude of a work area in which the autonomous work machine is to actually work, from the date and time information database and the azimuth information database.

According to the autonomous work machine of Arrangement 6, information (the azimuth information of the sun and the imaging date and time information, the position information, and the direction information of the autonomous work machine) of times at which backlighting occurs can be accumulated, as unique information of the work area, in accordance with the actual work. As a result, whether backlighting has occurred can be determined more accurately in accordance with the actual work by referring to the work area database.

Arrangement 7. The autonomous work machine according to the above-described embodiment further comprises:
a communication unit (for example, 44b of FIG. 2) configured to be capable of wireless communication with a server (for example, 350 of FIG. 2) via a network (for example, 302 of FIG. 2),
wherein the communication unit (44b) causes a storage unit of the server (350) to store the work area database (SD3) generated by the generation unit (C3), and
a determination unit of another autonomous work machine (for example, 15 of FIG. 2) that works in the work area refers to the work area database (SD3) based on imaging date and time information, position information, and direction information of the other autonomous work machine, and determines whether backlighting has occurred.

According to the autonomous work machine of Arrangement 7, by storing the work area database in a server on a network, the information of the work area database can be shared among a plurality of autonomous work machines that work in the work area.

The other autonomous work machine can refer to the work area database based on the imaging date and time information, the position information, and the direction information of the other autonomous work machine, and more accurately determine, in accordance with the actual work, whether backlighting has occurred.

Arrangement 8. In the autonomous work machine according to the above-described embodiment, the control unit (C2) sets a track for autonomous travel in the work area, and
when the autonomous work machine (10) has come close to a boundary (for example, 82 of FIG. 8) of the work area in the autonomous travel based on the track,
the control unit (C2) sets a track (for example, 802 of FIG. 8) in which the autonomous work machine (10) will turn at a predetermined turning angle, and
in case in which the determination unit (C1) determines that the backlighting has occurred in the track (802), the control unit (C2) will correct the track (802) into a track (for example, 803) obtained by returning the turning angle in a direction that can avoid the backlighting.

In a case in which the autonomous work machine continues to travel based on a track that does not travel toward the sun, a worked area in the work area may become skewed in some cases. According to the autonomous work machine of Arrangement 8, skewing of the work area can be prevented by correcting the preset track 802 into the track 803 which is obtained by returning the turning angle to a direction that will barely make the position of the sun S fall outside of a backlighting position.

Arrangement 9. In the autonomous work machine according to the above-described embodiment, in a case in which the determination unit (C1) determines that the backlighting has occurred, the control unit (C2) will control an angle of the camera (11) so the sun will not fall within the range of the angle of view of the camera.

Arrangement 10. In the autonomous work machine according to the above-described embodiment, the camera (11) is held by a pan angle adjustment mechanism (for example, 11b of FIG. 1B) configured to adjust an angle in a horizontal direction and a tilt angle adjustment mechanism (for example, 11c of FIG. 1B) configured to adjust an angle in a vertical direction, and the control unit (C2) will control at least one of the pan angle adjustment mechanism (11b) and the tilt angle adjustment mechanism (11c) to control the angle of the camera (11).

According to the autonomous work machines of Arrangement 9 and Arrangement 10, it is possible to prevent a detection error about the information of the external world from being generated by avoiding backlighting by controlling the angle of the camera while continuing the work.

Arrangement 11. In the autonomous work machine according to the above-described embodiment, in a case in which the determination unit (C1) has determined that a detection error has occurred a predetermined number of times, the determination unit will determine that a state of the external world has changed and update information of the work area database (SD3).

According to the autonomous work machine of Arrangement 11, the change in the state of the external world of each individual work area in which the autonomous work machine works can be reflected in the backlighting determination result.

Arrangement 12. A method of controlling the autonomous work machine according to the above-described embodiment is a method of controlling an autonomous work machine (for example, 10 of FIG. 2) that includes a camera (for example, 11 of FIG. 2) configured to capture an image of an external world, the method comprising:
a determination step (for example, S402, S404, and S406 of FIG. 4) of determining, based on an image captured by the camera (11), whether backlighting has occurred; and
a control step (for example, S407 of FIG. 4) of controlling, in a case in which the occurrence of the backlighting is determined in the determination step, the autonomous work machine to avoid the backlighting.

According to the method of controlling the autonomous work machine of Arrangement 12, the operation of the autonomous work machine can be controlled to avoid backlighting when the occurrence of backlighting is determined. Since accurate obtainment of information of the external world will be difficult in a backlit state, the autonomous work machine can be controlled to avoid backlighting to prevent a control error that may occur due to continuing work in a state in which the information of the external world cannot be obtained.

Arrangement 13. A program according to the above-described embodiment causes a computer (for example, 44a of FIG. 2) to execute each step of a method of controlling an autonomous work machine defined in Arrangement 12.

According to the program of Arrangement 13, the function of the autonomous work machine according to the present invention can be implemented by a computer.

What is claimed is:
1. An autonomous work machine that includes a camera configured to capture an image of an external world and works in a work area while autonomously traveling in the work area, comprising:
at least one processor circuit with a memory comprising instructions, that when executed by the at least one processor circuit, cause the at least one processor circuit to at least:
determine, based on an image captured by the camera, whether backlighting has occurred; and control, in a case in which it has been determined that the backlighting has occurred, the autonomous work machine to avoid the backlighting,
wherein the instructions, when executed by the at least one processor circuit, further cause the at least one processor circuit to at least, in a case in which an occurrence of the backlighting is determined while the autonomous work machine is traveling, control the autonomous work machine to avoid the backlighting by selecting either an on-the-spot turn mode or an advancing-while-turning mode based on a position and a direction of the autonomous work machine, after stopping the travel of the autonomous work machine.

2. The autonomous work machine according to claim 1, wherein the instructions, when executed by the at least one processor circuit, further cause the at least one processor circuit to at least cause the autonomous work machine to turn so the sun will not fall within a range of an angle of view of the camera.

3. The autonomous work machine according to claim 1, wherein whether the backlighting has occurred is further determined by comparing imaging date and time information of the autonomous work machine and date and time information obtained from a date and time information database which stores the date and time information indicating sunshine hours, and
the instructions, when executed by the at least one processor circuit, further cause the at least one processor circuit to at least, in a case in which the occurrence of the backlighting is determined, control the autonomous work machine to avoid the backlighting.

4. The autonomous work machine according to claim 3, wherein whether the backlighting has occurred is further determined by comparing the imaging date and time information, position information, and direction information of the autonomous work machine and azimuth information obtained from an azimuth information database which stores the azimuth information of the sun corresponding to date and time information, and
the instructions, when executed by the at least one processor circuit, further cause the at least one processor circuit to at least, in a case in which the occurrence of the backlighting is determined, control the autonomous work machine to avoid the backlighting.

5. The autonomous work machine according to claim 4, wherein the instructions, when executed by the at least one processor circuit, further cause the at least one processor circuit to at least:
generate, in a case in which the occurrence of the backlighting is determined, a work area database that associates the azimuth information of the sun with the imaging date and time information, the position information, and the direction information of the autonomous work machine,
wherein the instructions, when executed by the at least one processor circuit, further cause the at least one processor circuit to at least refer to the work area database based on the imaging date and time information, the position information, and the direction of the autonomous work machine when the autonomous work machine is working in a work area, and determine whether the backlighting has occurred.

6. The autonomous work machine according to claim 5, wherein the instructions, when executed by the at least one processor circuit, further cause the at least one processor circuit to at least:
be capable of wireless communication with a server via a network,
wherein the instructions, when executed by the at least one processor circuit, further cause the at least one processor circuit to at least cause a storage memory of the server to store the work area database, and
another autonomous work machine that works in the work area refers to the work area database based on imaging date and time information, position information, and direction information of the other autonomous work machine, and determines whether backlighting has occurred.

7. The autonomous work machine according to claim 1, wherein the instructions, when executed by the at least one processor circuit, further cause the at least one processor circuit to at least set a track for autonomous travel in the work area, and
when the autonomous work machine has come close to a boundary of the work area in the autonomous travel based on the track,
the instructions, when executed by the at least one processor circuit, further cause the at least one processor circuit to at least set a track in which the autonomous work machine will turn at a predetermined turning angle, and
in case in which it is determined that the backlighting has occurred in the track, correct the track into a track obtained by returning the turning angle in a direction that can avoid the backlighting.

8. The autonomous work machine according to claim 1, wherein the instructions, when executed by the at least one processor circuit, further cause the at least one processor circuit to at least, in a case in which it is determined that the backlighting has occurred, control an angle of the camera so the sun will not fall within the range of the angle of view of the camera.

9. The autonomous work machine according to claim 8, wherein the camera is held by a pan angle adjustment mechanism configured to adjust an angle in a horizontal direction and a tilt angle adjustment mechanism configured to adjust an angle in a vertical direction, and
the instructions, when executed by the at least one processor circuit, further cause the at least one processor circuit to at least control at least one of the pan angle adjustment mechanism and the tilt angle adjustment mechanism to control the angle of the camera.

10. The autonomous work machine according to claim 6, wherein the instructions, when executed by the at least one processor circuit, further cause the at least one processor circuit to at least, in a case in which it has been determined that a detection error has occurred a predetermined number of times, determine that a state of the external world has changed and update information of the work area database.

11. A method of controlling an autonomous work machine that includes a camera configured to capture an image of an external world and works in a work area while autonomously traveling in the work area, the method comprising:
determining, based on an image captured by the camera, whether backlighting has occurred; and
controlling, in a case in which the occurrence of the backlighting is determined in the determination step, the autonomous work machine to avoid the backlighting,
wherein in a case in which an occurrence of the backlighting is determined while the autonomous work machine is traveling, in the controlling, the autonomous work machine is controlled to avoid the backlighting by selecting either an on-the-spot turn mode or an advancing-while-turning mode based on a position and a direction of the autonomous work machine, after stopping the travel of the autonomous work machine.

12. A non-transitory computer-readable storage medium that stores a program for causing a computer to execute each step of a method of controlling an autonomous work machine defined in claim 11.

* * * * *